United States Patent Office 3,647,840
Patented Mar. 7, 1972

3,647,840
CUPROUS SULFONATE SALT COMPLEXES
James L. Bills, Provo, Utah, assignor to Monsanto Company, St. Louis, Mo.
No Drawing. Filed Feb. 10, 1970, Ser. No. 10,310
Int. Cl. C07f 1/08
U.S. Cl. 260—438.1
13 Claims

ABSTRACT OF THE DISCLOSURE

Cuprous sulfonate salt complexes comprise: (a) a cuprous sulfonate salt having the formula $RSO_3Cu$ wherein R is an organic radical containing 1 to 20 carbon atoms and having substituents which are hydrogen, chlorine, fluorine and combinations thereof; and (b) an organic complexing agent which is an aromatic hydrocarbon, an olefin hydrocarbon, a nitrile, a nitro-alkyl, a nitro-aryl, a sulfone or combination thereof. These cuprous sulfonate salt complexes have surface active properties rendering them useful as surface tension reducing agents, wetting agents, dispersing agents and emulsifying agents. These cuprous salt complexes are also useful for removing carbon monoxide impurities from gaseous streams.

BACKGROUND OF THE INVENTION

The present invention relates to a new class of organic complexes. In another aspect, this invention relates to novel cuprous sulfonate salt complexes.

Various metallic salts of sulfonic acids have been prepared and reported in the prior art. However, the preparation of cuprous sulfonic acid salts is unknown. I have discovered a new class of organic complexes comprising cuprous sulfonate salts and an organic complexing agent.

It is an object of my invention to provide a new class of organic complexes.

Another object of my invention is to provide a new class of cuprous sulfonate salt complexes.

Other aspects, advantages and objects of this invention will be apparent to those skilled in the art on consideration of the accompanying disclosure and claims.

SUMMARY OF THE INVENTION

My invention is a new class of organic complexes comprising:

(a) A cuprous sulfonate salt having the formula $RSO_3Cu$ wherein R is a radical containing 1 to 20 carbon atoms having substituents selected from the group consisting of hydrogen, chlorine, fluorine and combinations thereof; and (b) An organic complexing agent selected from the group consisting of aromatic hydrocarbons, olefin hydrocarbons, nitriles, nitro-alkyls nitro-aryls, sulfones and combinations thereof.

PREFERRED EMBODIMENTS

The cuprous sulfonate salt complexes of my invention exist as a complex of the specific cuprous sulfonate salt and an organic complexing agent that is either an aromatic hydrocarbon, an olefin hydrocarbon, a nitrile, a nitro-alkyl, a nitro-aryl, a sulfone or a combination thereof. Attempts to remove the organic complexing agent from the complex result in a decomposition of the complex to give metallic copper and various residual products. Usually, the organic complexing agent that is present in the cuprous sulfonate salt complexes of my invention is part of the reaction medium wherein the cuprous sulfonate salt is formed. Thus, if it is desired to form a cuprous sulfonate salt complex containing a specific cuprous sulfonate salt and toluene, the cuprous sulfonate salt will be formed in the presence of toluene, which would serve as the complexing agent.

The cuprous sulfonate salt component of the complexes of my invention can be produced by reacting a sulfonic acid with cuprous oxide in the presence of the desired complexing agent. This reaction can be represented by the following equation:

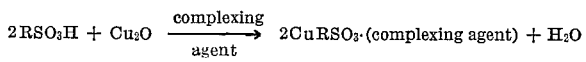

As used in the above equation "complexing agent" will be either an aromatic hydrocarbon, an olefin hydrocarbon, a nitrile, a nitrile, a nitro-alkyl, a nitro-aryl, a sulfone or a combination thereof. The reaction can be conveniently carried out by combining the reactants and heating them to a reflux temperature. Inert diluents such as liquid paraffins and the like may also be present in the reaction medium. The reaction medium is refluxed and the water reaction product can be condensed overhead. In some instances, the water product is conveniently recovered as an azeotrope of the water and the reaction medium. The water reaction product can also be removed by other methods such as by use of a dessicant. It is of course understood that when the reactants or the reaction medium are quite volatile, the reaction should be carried out in a closed reaction zone under a positive pressure. The reaction represented by the equation above, is usually carried out at a temperature in excess of 75° C. It is usually desirable to carry out the reaction at atmospheric pressure or above.

It is desirable to have at least a 1:1 mol ratio of the complexing agent to sulfonic acid present in the reaction medium for carrying out the above reaction. Larger mol ratios of complexing agent to sulfonic acid are desired for carrying out the reaction.

In some instances it may be desirable to carry out the above-mentioned reaction in the presence of a small amount of metallic copper. The presence of a small amount of copper in the above-mentioned reaction tends to increase the yield of the cuprous sulfonate salt complex. When copper is present during the reaction it may be first washed with HCl and/or amalgamated.

The cuprous sulfonate salt complexes of my invention can also be prepared by reacting a sulfonic acid with basic cupric carbonate in an aqueous solution. This reaction is represented by the following equation:

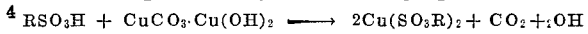

The cupric sulfonate salt is carefully dried and then reduced by reacting with metallic copper in the presence of the appropriate complexing agent to produce the desired cuprous sulfonate salt complex. This reaction is represented by the following equation:

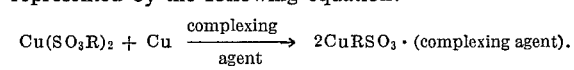

I carrying out the above reaction, the reactivity of the copper may be increased if the metallic copper is first washed with hydrochloric acid and/or amalgamated. In some instances the above reaction, wherein the cupric sulfonate salt is reduced with metallic copper, is carried out in the presence of an additional polar solvent such as sulfolane or nitrobenzene. These polar solvents aid in dissolving the cupric salt, thus increasing the reaction rates. Inert diluents such as liquid paraffins may also be present in the reaction medium. The above reactions for producing the cupric sulfonate salts and the cuprous salt complexes therefrom can be carried out at atmospheric pressures and at reflux temperatures. Temperatures of 20° C. and above and pressures of at least 1 atmosphere will be utilized in carrying out the reaction. The mol ratio of complexing agent to cupric sulfonic acid salt should be at least 1:1 in the above reaction, with larger ratios being preferred.

The sulfonic acids used in the foregoing reactions can be represented by the structural formula RSO₃H, wherein R contains from 1 to 20 carbon atoms and contains substituents selected from the group consisting of hydrogen, chlorine, fluorine and combinations thereof. Thus, the R group on the sulfonic acid starting material and the R group in the cuprous sulfonate salt product can be hydrocarbon, flurocarbon, chlorocarbon, flurohydrocarbon, chlorohydrocarbon and flurochlorohydrocarbon.

Non-limiting examples of the sulfonic acid starting materials include methane sulfonic acid, chloromethane sulfonic acid, fluromethane sulfonic acid, chlorofluromethane sulfonic acid, difluromethane sulfonic acid, trifluromethane sulfonic acid, ethane sulfonic acid, 2-chloroethane sulfonic acid, pentachloroethane sulfonic acid, isobutane sulfonic acid, propane sulfonic acid, heptachloropropane sulfonic acid, n-heptane sulfonic acid, decane sulfonic acid, n-eicosane sulfonic acid, benzene sulfonic acid, para-toluene sulfonic acid, para-chlorobenzene sulfonic acid, 2,4,6-trifluorobenzene sulfonic acid, β-naphthalene sulfonic acid, cyclohexane sulfonic acid, para-butylbenzene sulfonic acid, 2-chloro-4-fluro-6-ethylbenzene sulfonic acid, and the like.

As shown by the above formulae, the sulfonic acid starting material determines the cuprous sulfonic acid salt portion of my novel complexes. Thus, the "R group" on the sulfonic acid starting material is unchanged in the above-mentioned reactions.

The organic complexing agents referred to in the above-mentioned formulae are selected from the group consisting of aromatic hydrocarbons, olefin hydrocarbons, nitriles, nitro-alkyls, nitro-aryls, sulfones and combinations thereof. These complexing agents become a part of the cuprous sulfonate salt complexes of my invention. Thus, the cuprous sulfonate salt complexes of my invention can be represented graphically by the formula

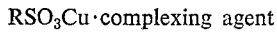

RSO₃Cu·complexing agent

The cuprous sulfonate salt portion of the complexes of my invention is unstable in the pure state and exists only as a complex of the cuprous sulfonate salt and a complexing agent.

When mixtures of the complexing agents are present during the preparation of the cuprous sulfonate salt complexes of my invention, the final cuprous sulfonate salt complex will comprise mixed complexes of the various complexing agent. Mixed complexes can also be prepared by contacting the cuprous sulfonate salt complexes with a different complexing agent. For example, a cuprous sulfonate salt complex can be prepared in toluene and the resulting cuprous sulfonate salt·(toluene) complex can be combined with an olefin such as ethylene to produce a cuprous sulfonate salt·(toluene+ethylene) complex. This procedure is also useful for making complexes wherein unsaturated nitriles serve as the complexing agents. In some instances the unsaturated nitrile compounds may tend to polymerize under the reaction conditions wherein the cuprous sulfonate salt complex is formed. Therefore, to prevent this undesired polymerization, an initial complex can be formed comprising the cuprous sulfonate salt complexed with a complexing agent such as an aromatic compound, an olefin, one of the nitro compounds or one of the sulfones and this first complex can be thereafter treated with the unsaturated nitrile to produce the desired cuprous sulfonate salt complexed with the unsaturated nitrile.

The complexing agent that is a portion of the novel cuprous sulfonate salt complexes of my invention can be a hydrocarbon aromatic compound, an olefin hydrocarbon compound, a nitro-alkyl compound, a nitro-aryl compound, a sulfone compound or a nitrile. Usually the complexing agents used in preparing the novel complexes of my invention will have from 1 to 10 carbon atoms per molecule. Suitable aromatic compounds are benzene, toluene, o-xylene, m-xylene, p-xylene, ethylbenzene, styrene, 1,3,5-trimethylbenzene, naphthalene, β-ethylnaphthalene, hexamethylbenzene, isopropylbenzene, para-isopropyltoluene, α-methylstyrene, and the like.

Non-limiting examples of olefin hydrocarbons that can be used as the complexing agent in the novel cuprous sulfonate salt complexes of my invention include ethylene, propylene, isobutylene, hexene-1, hexene-2, cyclohexene, decene-1, 1,3-butadiene, isoprene, and the like.

The nitriles that can be utilized as the complexing agent in the cuprous sulfonate salt complexes of my invention include acetonitrile, acrylonitrile, methacrylonitrile, and the like. The nitrile complexing agents can also be nitrile ethers and nitrile esters such as 3-methoxyacetonitrile, 3-ethoxyacetonitrile, 3-methoxypropionitrile, 3-ethoxypropionitrile, 3-propoxypropionitrile, 4-methoxybutyronitrile, methoxyethoxy propionitrile, dicyanothylated propylene glycol, and the like.

The nitro-alkyls and nitro-aryls that can be utilized as the complexing agent in the cuprous sulfonate salt complexes of my invention include nitromethane, nitroethane, nitropropane, nitrobutane, nitrobenzene, dinitrobenzenes, nitrotoluenes and the like. Usually the nitro-alkyl employed contain no greater than 12 carbon atoms in the alkyl group and the nitro aromatics contain no greater than 12 carbon atoms.

The sulfones that are useful as complexing agents in the cuprous sulfonate salt complexes of my invention include ethyl sulfone, propyl sulfone, methylethyl sulfone, methylbutyl sulfone, and other alkyl sulfones containing up to 6 carbon atoms in the alkyl radicals, the alkyl radicals being the same or different and being either straight chain or branched chain. The alkyl sulfones include sulfolane and the alkyl sulfolanes, particularly the alkyl sulfonlanes in which the alkyl radicals have 1 to 6 carbon atoms. The most useful of the sulfones are sulfolane and the methyl sulfolanes.

Mixtures of the above complexing agents can be present in the complexes of my invention.

The cuprous sulfonic acid salt complexes of my invention have surface active properties. These surface active properties render them useful as surface tension reducing agents, wetting agents, dispersing agents and emulsifying agents.

The cuprous sulfonate salt complexes of my invention also have particular utility in that they can be used to remove carbon monoxide from gaseous streams that contain carbon monoxide impurities. By contacting a gaseous stream containing carbon monoxide impurities with the cuprous sulfonate salt complexes, the carbon monoxide is removed from the gas and remains in the cuprous sulfonate salt complex.

The following examples are illustrative examples and are not to be interpreted as unduly limiting the scope of the invention.

EXAMPLE I

Cuprous trifluromethane sulfonate complex was prepared by charging 17 parts by weight cuprous oxide, 30 parts by weight m-xylene, and 115 parts by weight toluene to a reaction vessel that was fitted with a reflux water trap. This suspension was stirred under nitrogen and 33.7 parts by weight trifluromethane sulfonic acid was slowly added. This mixture was heated to reflux temperature at atmospheric pressure. The mixture was refluxed until no more water was collected in the reflux water trap in the upper portion of the reaction vessel. The liquid reaction mixture was drained from the reaction vessel and cooled. A solid crystal complex was recovered from the cooled reaction medium. This solid was identified as cuprous trifluromethane sulfonate complexed with toluene and m-xylene.

EXAMPLE II

Cuprous propane sulfonate complex was prepared by charging 12.4 parts by weight propane sulfonic acid with 108 parts by weight m-xylene to a reaction vessel equipped with a reflux water trap. 1 part by weight copper powder was also added to the reaction vessel. 8 parts by weight cuprous oxide was added to the reaction vessel and the mixture was heated under a blanket of nitrogen with stirring to a reflux temperature. The reaction vessel was maintained at atmospheric pressure and at reflux temperature until no additional water was collected in the reflux water trap. The reaction mixture was cooled and a solid was recovered from the reaction mixture and identified as cuprous propane sulfonate complexed with m-xylene.

EXAMPLE III

Heptadecane sulfonic acid is prepared by saturating a solution of sodium n-heptadecane sulfonate in para-xylene with HCl at 25° C. Excess HCl is purged from the n-heptadecane sulfonic acid by refluxing the solution at atmospheric pressure. The resulting solution is made up of 100 parts by weight para-xylene and 31.2 parts by weight n-heptadecane sulfonic acid. This solution is placed in a reaction vessel equipped with a reflux water trap in the upper portion thereof and the air space above the solution was purged with dry nitrogen. 7.2 parts by weight cuprous oxide is added to the reaction vessel and the vessel is heated to reflux temperature under atmospheric pressure. After refluxing the reaction mixture until no additional water is collected in the water trap, the reaction mixture is cooled to 0° C. and the excess liquid was filtered from the resulting solid. This solid is dried in a stream of dry nitrogen for twenty-four hours to give approximately 42 parts by weight solid material that is identified as cuprous heptadecane sulfonate complexed with para-xylene.

EXAMPLE IV

The procedure of Example I is followed except that benzene sulfonic acid is added to the reaction vessel containing ocetene-1 as a reaction medium. The resulting solid material obtained by filtering the cooled reaction mixture is identified as cuprous benzene sulfonate complexed with octene-1.

EXAMPLE V

The procedure of Example I is followed except that chlorofluromethane sulfonic acid is added to a reaction vessel containing cuprous oxide and toluene. The resulting solid material obtained from the cooled reaction product is washed with acrylonitrile and the washed solid is identified as cuprous chlorofluromethane sulfonate complexed with acrylonitrile and toluene.

EXAMPLE VI

The cuprous propane sulfonate complexed with m-xylene prepared in Example I is dissolved in excess sulfolane solvent. A gaseous mixture of 98% nitrogen and 2% carbon monoxide is bubbled through the solution. The gaseous product collect overhead contains less than 0.5% carbon monoxide.

It will be apparent to those skilled in the art that many variations and modifications can be made in the foregoing disclosure without departing from the spirit and scope of the invention.

I claim:
1. A cuprous sulfonate salt complex comprising: (a) a cuprous sulfonate salt having the formula $RSO_3Cu$ wherein R is a radical selected from the group consisting of fluorocarbon, chlorocarbon, fluorohydrocarbon, chlorohydrocarbon and fluorochlorohydrocarbon; and (b) at least one organic complexing agent selected from the group consisting of aromatic hydrocarbons, olefin hydrocarbons, nitro-alkyls, nitro-aryls, sulfones and nitriles.
2. The cuprous sulfonate salt complex of claim 1 wherein said R group consists of fluorohydrocarbon.
3. The cuprous sulfonate salt complex of claim 1 wherein said R group consists of chlorohydrocarbon.
4. The cuprous sulfonate salt complex of claim 1 wherein said R group consists of fluorochlorohydrocarbon.
5. The cuprous sulfonate salt complex of claim 1 wherein said R group consists of fluorocarbon.
6. The cuprous sulfonate salt complex of claim 1 wherein said R group consists of chlorocarbon.
7. The cuprous sulfonate salt complex of claim 1 wherein said organic complexing agent is an alkyl substituted aromatic.
8. The cuprous sulfonate salt complex of claim 5 wherein said salt is $CF_3SO_3Cu$.
9. The cuprous sulfonate salt complex of claim 4 wherein said salt is $CHClFSO_3Cu$.
10. The cuprous sulfonate salt complex of claim 8 wherein said organic complexing agent is an alkyl substituted aromatic.
11. The cuprous sulfonate salt complex of claim 10 wherein said alkyl substituted aromatic is m-xylene.
12. The cuprous sulfonate salt complex of claim 1 wherein said organic complexing agent has from 1 to 10 carbon atoms per molecule.
13. The cuprous sulfonate salt complex of claim 12 wherein said organic complexing agent is an olefin hydrocarbon.

References Cited

UNITED STATES PATENTS

| | | | |
|---|---|---|---|
| 3,520,947 | 7/1970 | Blytas | 260—681.5 C |
| 3,401,112 | 9/1968 | Dunlop et al. | 260—681.5 C X |
| 3,025,322 | 3/1962 | Smolin et al. | 260—438.1 X |
| 2,864,742 | 12/1958 | Whetstone et al. | 260—438.1 X |
| 2,768,986 | 10/1956 | Johnson et al. | 260—674 SE |
| 3,415,615 | 12/1968 | Blytas et al. | 23—2 R |

TOBIAS E. LEVOW, Primary Examiner

H. M. S. SNEED, Assistant Examiner

U.S. Cl. X.R.

23—2 R; 252—353